Jan. 6, 1970      L. A. LINSTEAD      3,487,557
SWEATER DRIER
Filed Feb. 5, 1968       2 Sheets-Sheet 1
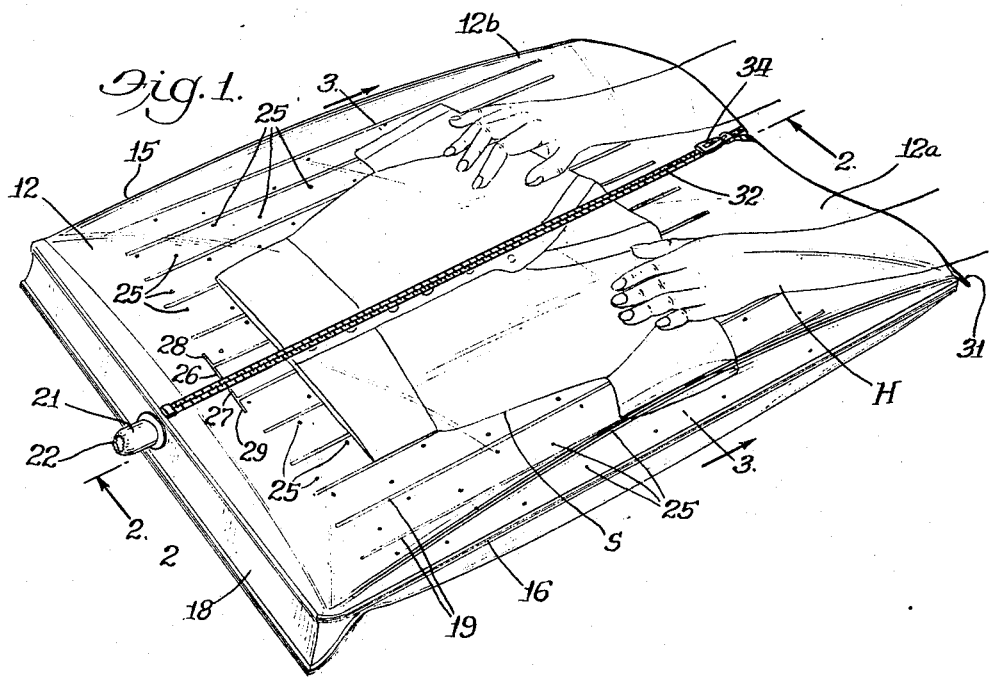
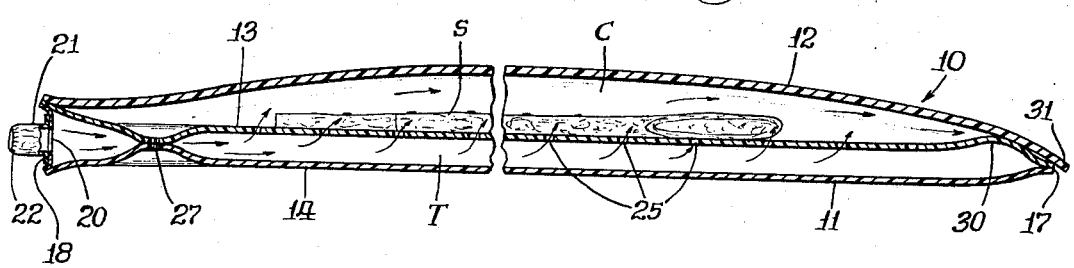
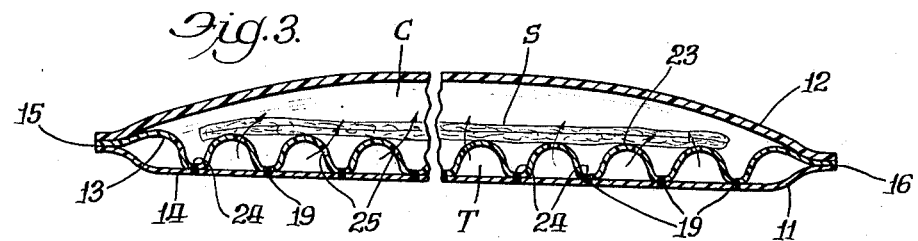
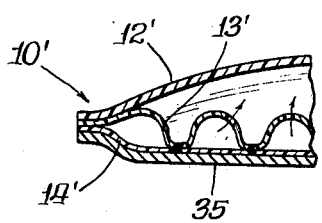
Inventor:
Lorraine A. Linstead
By: Dawson, Tilton, Fallon & Lungmus
Attys.

Jan. 6, 1970     L. A. LINSTEAD     3,487,557
SWEATER DRIER
Filed Feb. 5, 1968     2 Sheets-Sheet 2
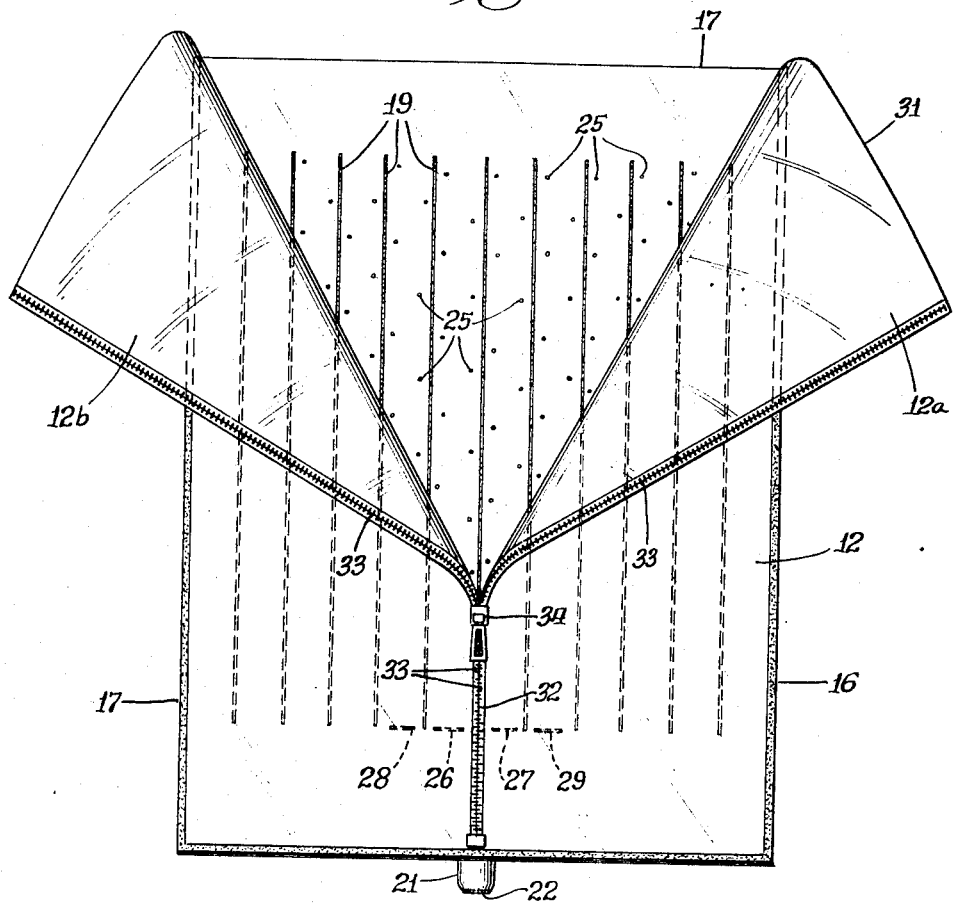
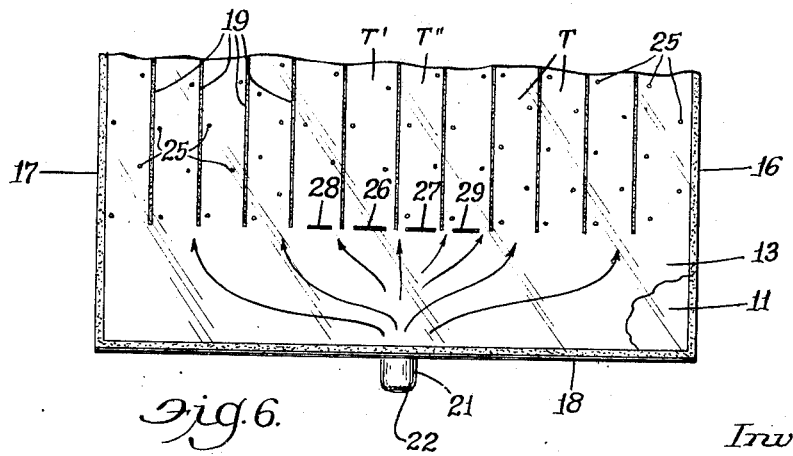
Inventor:
Lorraine A. Linstead
By:
Dawson, Tilton, Fallon & Lungmus
Attys.

United States Patent Office 3,487,557
Patented Jan. 6, 1970

3,487,557
SWEATER DRIER
Lorraine A. Linstead, P.O. Box 2133,
Loves Park, Ill. 61111
Filed Feb. 5, 1968, Ser. No. 703,172
Int. Cl. F26b 13/10
U.S. Cl. 34—151                             11 Claims

ABSTRACT OF THE DISCLOSURE

A sweater drier which encases the sweater in warm, dry air and passes warm air through the sweater. The drier includes a bottom made of two sheets of plastic which are heat sealed around the edges thereof and a transparent plastic cover which is heat sealed to the bottom, also around the edges. The two sheets of the bottom are also joined along spaced-apart parallel lines to provide air-flow tubes, and the upper sheet of the bottom is provided with openings through which air can flow upwardly. A connection is provided for a suitable air source such as a hair drier or air blower, and air is directed between the two plastic sheets. The relatively small openings in the upper sheet restrain the air from escaping from between the two sheets, and the air-flow tubes billow to form elongated pillow-like ridges. The sweater or other garment to be dried is placed on the ridges and covered by the top of the sweater drier. The air passes upwardly through the openings and through the sweater and is retained within the enclosure formed by the top and bottom until the pressure is sufficient to allow the air to escape between the unconnected edges of the top and bottom. The relatively humid air which thus escapes carries moisture away from the sweater and is replaced by drier air from the air source.

BACKGROUND OF THE INVENTION

This invention relates to sweater driers.

It has long been a problem to provide a sweater drier which will quickly dry a sweater without shrinkage and which may be used with sweaters of varying sizes. This problem is reflected in the number of prior attempted solutions. Sweater driers in the past have taken the form of wire hangers or the like which are inserted within the sweater and which prevent the sweater from shrinking while it dries. However, these hangers are rather difficult to position within the sweater, sometime leave ridges or outlines of the wire in the dried sweater, and are not readily adapted for use with different sized sweaters.

Other sweater driers have taken the form of drying racks on which the sweater is laid in a generally horizontal manner. These racks usually do not permit free circulation of the ambient air and frequently require elaborate and bulky supporting means which must be assembled and disassembled each time a sweater is to be dried.

SUMMARY OF THE INVENTION

The inventive sweater drier provides fast, uniform drying by passing warm dry air through the sweater and by maintaining the sweater in an atmosphere of warm air. Moist ambient air in constantly being replaced by dry air to speed the drying process. The drier has no parts to assemble and no form which must be inserted within the sweater. The sweater is merely placed within the drier and positioned to assume its proper outline. After the sweater is dry, the drier may be folded into a light-weight, compact package for storing or carrying.

DESCRIPTION OF THE DRAWINGS

FIG. 1 is a perspective view of the inventive sweater drier showing a sweater being positioned within the drier;

FIG. 2 is a sectional elevational view taken along the line 2—2 of FIG. 1;

FIG. 3 is a broken sectional view taken along the line 3—3 of FIG. 1;

FIG. 4 is a fragmentary sectional view similar to FIG. 3 showing an alternative view of the drier;

FIG. 5 is a top plan view showing the cover opened; and

FIG. 6 is a top plan view of the drier with the cover removed smhowing the baffle and air connection arrangement.

DESCRIPTION OF SPECIFIC EMBODIMENT

Referring to FIGS. 1–3, the numeral 10 designates generally a sweater drier in which a sweater S is being positioned by hands H. The invention will be described in connection with a sweater, but it is to be understood that the drier may be used with other garments. The drier 10 is generally rectangular in shape and includes bottom 11 and a cover 12. The bottom 11 is formed by a pair of generally rectangular sheets or layers, an upper sheet 13 and a lower sheet 14. The sheets 13 and 14 are joined along three sides thereof as at 15, 16, and 17, and a gusset strip 18 connects the sheets along the fourth sides thereof. It has been found advantageous to form the sheets 13 and 14 of plastic, and the joints 15–17 and the connections to the gusset strip 18 can be formed by heat sealing. If desired, however, the sheets 13 and 14 can be joined by stitching, adhesive, or other suitable means. The upper and lower sheets 13 and 14 are also joined along spaced-apart lines 19 which extend generally parallel to sides 15 and 16. If the sheets are plastic, the connection along the lines 19 may also be accomplished by heat sealing.

An annularly shaped reinforcing disk is attached to the gusset strip 18, and an opening is provided through the gusset strip in the center of the disk 20. A flexible air inlet hose 21 is secured to the disk about the opening therein. The hose 21 provides connecting means for attaching the sweater drier to the air hose of a hair drier, the blower end of a vacuum cleaner, or other air source. Preferably, the outer end of the inlet hose 21 is provided with an elastic band or tie band 22 to adapt the hose to be attached to air supply hoses of various sizes.

The air from the hair drier or other source flows through the hose 21 and is forced between the sheets 13 and 14, causing the sheets to separate and billow where they are not joined along the lines 19. Referring to FIG. 3, the air pressure between the sheets 13 and 14 pushes the sheet 13 upwardly between connection lines to form elongated air-flow tubes T, causing the bottom 11 to assume a ribbed or corrugated configuration with sweater-supporting peaks 23 and valleys 24. The height of the peaks or ridges 23 can be increased by providing more material of sheet 13 between the joints 19 than of sheet 14. Air escapes from the air-flow tubes T through openings 25 provided in the upper sheet 13 between the lines 19. The size of the openings 25 are exaggerated in the drawing for the purpose of illustration, and the openings should be small enough to provide sufficient resistance so that the air pressure builds up between the sheets 13 and 14 enough to billow the tubes T.

Referring to FIG. 6, the connections 19 are seen to terminate short of the sides of the sheets 13 and 14 which are joined by the gusset strip 18 so that air may flow from the connecting hose 21 into all of the air-flow tubes T. In order to cause the air to flow substantially uniformly into all of the air-flow tubes as indicated by the arrows and to prevent excessive air pressure from building up in the air-flow tubes T' and T" directly in line with the connecting hose 21, baffle means can be provided by joining the sheets 13 and 14 across each of the mouths of the tubes T' and T" for substantially the entire width of the mouth as at 26 and 27. A sufficient opening into these tubes is left to allow air to enter and billow these tubes. The mouths of the tubes adjacent tubes T' and T'' may also be closed somewhat as at 28 and 29, respectively.

Referring to FIGS. 2 and 5, the connecting lines 19 also terminate short of the edge 17 of the bottom 11, and the air pressure between the sheets 13 and 14 forms a pillow-like hump 30 adjacent the edge 17. The distance between the edge 17 and the adjacent ends of the connection lines 19 is greater than the distance between adjacent lines 19, and the hump 30 is somewhat higher than the peaks 23 and extends transversely thereof. The portion of the upper sheet 13 which forms the hump 30 is preferably free of any air openings 25.

Cover 12 is secured to the upper sheet 13 along the edges 15 and 16 of the bottom 11 and along the connection of the upper sheet 13 to the gusset strip 18. The unattached side 31 of the cover 12 extends over the hump 30 and somewhat beyond the edge 17 of the bottom. The weight of the free end 31 of the cover supported by the hump 30 resists the flow of air therebetween, and the air flowing upwardly through the openings 25 in the upper sheet 13 is restrained between the cover and the upper sheet. The pressure of this air builds up, causing the cover 12 to billow and form a drying chamber C between the cover and the upper sheet. When the pressure in the drying chamber C becomes sufficient to lift the free end 31 of the cover from the hump 30, the drier 10 reaches an equilibrium level, and air flows from the sweater drying chamber C between the cover end 31 and the hump 30 at the same rate that air flows through the air inlet hose 21 from the air source.

Referring to FIG. 5, the cover 12 is preferably formed in two halves 12a and 12b which are releaseably joined by a zipper 32 which extends from the gusset strip 18 to the cover end 31. The particular zipper means shown is a conventional zipper having fastening elements 33 along the edges to be joined and a draw fastener 34. As used herein, however, the term "zipper means" is meant to include equivalent means for joining the cover portions 12a and 12b such as snaps, adhesive, or the like.

In operation, the zipper 32 is first released and the cover portions 12a and 12b folded away from the bottom 11 as illustrated in FIG. 5. The sweater S which is to be dried is then placed on top of upper sheet 13 and is positioned so that the sweater assumes the outline that is desired when the sweater is dry. The cover portions 12a and 12b are then folded over the sweater and the draw fastener 34 is pulled to join the cover portions. Excessive moisture may be removed from the sweater before placing it in the drier by wrapping it in a towel.

The connecting hose 21 may be connected to the air source either before or after the sweater is positioned on the upper sheet 13. Once the air source is attached, the air flows into the tubes T, forming the ridges 23. The pressure in the air-flow tubes T is sufficient to support the sweater S on the ridges 23, and the sweater is unsupported between adjacent ridges (FIG. 3). The air from the air source, which is preferably warm, flows through the tubes T, through the openings 25, and then through the sweater S, carrying moisture away from the sweater. Since the sweater is positioned within the chamber C formed by the cover 12 and the upper sheet 13, it is maintained in a warm atmosphere capable of holding a relatively high amount of moisture. Dry air is constantly being supplied from the air source and flows into the chamber C, forcing relatively humid air from the chamber between the free end 31 of the cover and the hump 30.

The sweater-supporting ridges 24 do not support the sweater throughout the entire area thereof and allow moisture to drain away from the sweater. The ridges also hasten the drying process and provide uniform drying by allowing air to pass underneath the sweater between adjacent ridges.

While the sweater is being dried, it may be desirable to check the drying progress or to reposition the outline of the sweater. As illustrated in FIG. 1, a person may insert his hands between the free end 31 of the cover 12 and hump 30 into the drying chamber without allowing too much of the warm ambient air within the chamber to escape. When the hands are removed from the chamber, the free end 31 drapes over the hump 30, and the chamber is automatically resealed to restrain the warm air from leaving the drying chamber and to prevent cool outside air from entering.

In the preferred embodiment, the cover 12 is made of transparent plastic so that the sweater may be observed, and the lower sheet 14 is made of light-colored relatively opaque plastic so that the heat from the warm air is reflected upwardly toward the sweater.

Referring to FIG. 4, an alternative embodiment 10' of the sweater drier also includes a cover 12' and a bottom having upper and lower sheets 13' and 14', respectively. However, an insulating layer 35 of plastic foam or the like is laminated to the lower sheet 14' to decrease the transfer of heat from the sweater drier to the supporting surface.

The sweater drier may be used in any convenient location and may be placed on a bed, floor, table, etc. When the sweater is thoroughly dried, the zipper may be used to unfasten cover portions 12a and 12b or the sweater may be withdrawn through the open end of the chamber C. When the inlet hose 21 is disconnected from the air supply, the air-flow tubes T and cover 12 collapse, and the sweater drier may be folded into a compact configuration. FIGS. 2 and 3 illustrate the drier in use, but when the air supply is not connected the thickness of the drier is reduced to about the sum of the thicknesses of the cover 12 and sheets 13 and 14. The compactness of the folded drier and its light weight particularly adapt it for use on trips and vacations. The dried may readily be packed in a suitcase or overnight bag and takes up a minimum of space.

While in the foregoing specification I have described embodiments of my invention with considerable detail for purposes of illustration, it is to be understood that many of the details may be varied considerably by those in the art without deparing from the spirit and scope of my invention.

I claim:

1. A garment drier comprising a bottom and a cover, said bottom and cover being of generally rectangular shape and of approximately the same size, said bottom having an upper garment-supporting layer and a lower layer, said upper and lower layers being joined around the edges thereof and at a plurality of points within said edges, means for directing air into the space between unjoined portions of said upper and lower layers, said upper layer being provided with a plurality of openings therethrough, said cover and said bottom being joined along three sides thereof.

2. The garment drier of claim 1 in which said cover and bottom are plastic, said cover being relatively transparent and said lower layer being relatively opaque, said upper and lower layers being joined by heat sealing, said cover and bottom being joined by heat sealing.

3. A garment drier comprising a generally flat bottom and a generally flat cover of approximately the same size, said bottom having an upper garment-supporting layer and a lower layer, said upper and lower layers being joined around the edges thereof and at a plurality of points within said edges, means for directing air into the space between unjoined portions of said upper and lower layers, said upper layer being provided with a plurality of openings therethrough, said cover and bottom being joined along a major portion of the peripheries thereof.

4. The garment drier of claim 3 in which said upper and lower layers are joined along spaced-apart generally parallel lines within said edges to provide air-flow tubes.

5. The garment drier of claim 3 in which said cover and bottom are plastic, said cover being relatively transparent and said lower layer being relatively opaque, said upper and lower layers being joined by heat-sealing, said cover and bottom being joined by heat sealing.

6. A garment drier comprising a bottom and a cover, each of said bottom and cover being generally rectangular and providing four sides, said bottom having an upper sheet and a lower sheet, said upper and lower sheets being joined at a plurality of points thereon, connecting means on one side of said bottom adapted to be connected to an air source for supplying air to the space between unjoined portions of said upper and lower sheets, said upper sheet being provided with a plurality of openings therethrough, said cover and bottom being joined along three sides thereof and being unjoined along at least a portion of the fourth side thereof.

7. The garment drier of claim 6 in which the fourth bottom side is opposite said one bottom side, said upper and lower sheets being joined along the edges thereof and along spaced-apart generally parallel lines extending from adjacent said one bottom side to adjacent said fourth bottom side.

8. The structure of claim 6 in which said cover includes zipper means extending from the unjoined portion of the cover for allowing the cover to be folded to expose said upper sheet.

9. A garment drier comprising a bottom and a cover, said bottom and cover being of generally rectangular shape and of approximately the same size, said cover and bottom being joined along 3 sides thereof, said bottom having an upper garment-supporting layer and a lower layer, said upper and lower layers being joined around the edges thereof and along spaced-apart generally parallel lines to provide air-flow tubes, said lines extending transversely of and terminating short of the bottom side unversely of and terminating short of the bottom side unjoined to said cover for forming a hump extending transversely of said lines adjacent said unjoined bottom side when air is directed into the space between said upper and lower layers, means for directing air into the space between unjoined portions of said upper and lower layers, said upper layers being provided with a plurality of openings therethrough, said cover extending over said hump.

10. The garment drier of claim 9 in which said air-directing means includes an air inlet opening on said bottom adjacent the bottom side opposite said unjoined bottom side, and baffle means on said bottom for directing air from said air inlet opening substantially uniformly to each air-flow tube, said baffle means including connections between said upper and lower sheets, said connections extending generally transversely between at least a pair of said tube-providing lines for substantially the entire distance therebetween.

11. The garment drier of claim 9 in which said air directing means includes an air inlet opening on said bottom adjacent the bottom side opposite said unjoined bottom side, and baffle means on said bottom for directing air from said air inlet opening substantially uniformly to each air-flow tube.

References Cited

UNITED STATES PATENTS

| | | | |
|---|---|---|---|
| 3,264,755 | 8/1966 | Moore | 34—151 |
| 3,358,388 | 12/1967 | Weiss et al. | 34—239 |
| 3,358,383 | 12/1967 | Snider | 34—99 |

FREDERICK L. MATTESON, Jr., Primary Examiner

H. B. RAMEY, Assistant Examiner